United States Patent
Huang et al.

(10) Patent No.: US 10,937,459 B1
(45) Date of Patent: Mar. 2, 2021

(54) DISC GRABBING DEVICE ADAPTED TO DISC ARCHIVE SYSTEM

(71) Applicants: LITE-ON ELECTRONICS (GUANGZHOU) LIMITED, Guangzhou (CN); LITE-ON TECHNOLOGY CORPORATION, Taipei (TW)

(72) Inventors: Cheng-Wen Huang, Taipei (TW); Ming-Chun Tsao, Taipei (TW); Hui-Chung Leu, Taipei (TW)

(73) Assignees: LITE-ON ELECTRONICS (GUANGZHOU) LIMITED; LITE-ON TECHNOLOGY CORPORATION

( * ) Notice: Subject to any disclaimer, the term of this patent is extended or adjusted under 35 U.S.C. 154(b) by 0 days.

(21) Appl. No.: 16/859,661

(22) Filed: Apr. 27, 2020

(30) Foreign Application Priority Data

Nov. 8, 2019 (CN) .......................... 201911088549.X (51) Int. Cl.
*G11B 17/054* (2006.01)
*G11B 17/16* (2006.01)
*G11B 17/10* (2006.01)

(52) U.S. Cl.
CPC ............ *G11B 17/054* (2013.01); *G11B 17/10* (2013.01); *G11B 17/167* (2013.01)

(58) Field of Classification Search
None
See application file for complete search history.

(56) References Cited

U.S. PATENT DOCUMENTS

| 8,355,301 | B2* | 1/2013 | Ebina | G11B 17/225 369/30.57 |
| 10,262,687 | B1* | 4/2019 | Chang | F16H 37/065 |
| 10,388,317 | B2* | 8/2019 | Chang | G11B 17/0284 |
| 2010/0182884 | A1* | 7/2010 | Lin | G11B 17/22 369/53.2 |
| 2019/0027185 | A1* | 1/2019 | Chang | G11B 17/12 |

FOREIGN PATENT DOCUMENTS

CN 108820877 A * 11/2018

OTHER PUBLICATIONS

English-machine Translation of CN 108820877 A, Cao et al., published on Nov. 16, 2018 (Year: 2018).*

* cited by examiner

*Primary Examiner* — William J Klimowicz
(74) *Attorney, Agent, or Firm* — Innovation Counsel LLP (57) ABSTRACT

A disc grabbing device adapted to a disc archive system for grabbing at least one disc is provided. The disc grabbing device includes a center cylinder, a drive controller and a detection device. When the disc is grabbed by the disc grabbing device, the center cylinder passes through the center hole of the disc. The drive controller is configured to control the disc grabbing device to grab the disc. The detection device is electrically connected to the drive controller to detect a surface of a disc placed on a disc tray to be grabbed, and to correspondingly transmit a drive stop signal to the drive controller to stop the operation of the disc grabbing device.

12 Claims, 6 Drawing Sheets

DISC GRABBING DEVICE ADAPTED TO DISC ARCHIVE SYSTEM

This application claims the benefit of People's Republic of China application Serial No. 201911088549.X, filed Nov. 8, 2019, the subject matter of which is incorporated herein by reference.

BACKGROUND OF THE INVENTION

Field of the Invention

The invention relates in general to a grabbing device, and more particularly to a disc grabbing device adapted to a disc archive system.

Description of the Related Art

The disc archive system, which uses discs as a data storage medium, normally includes multiple disc drives, a disc library for placing multiple discs, and a disc grabbing device. The disc grabbing device is configured to pick up and unload discs, and move discs between the disc library and the disc drives. For example, the disc grabbing device grabs a disc from the disc library and then moves and unloads the disc to the disc drive; or, the disc grabbing device grabs a disc from the disc drive and then moves and unloads the disc to the disc library. To increase the disc handling efficiency, the disc grabbing device may grab multiple discs and then move and unload the multiple discs at one time. For example, the disc grabbing device may grab multiple discs from the disc library and then moves and unloads the multiple discs to corresponding disc drives respectively. The disc grabbing device may grab the discs from respective disc drives, and then unload the grabbed discs to the disc library.

However, when the disc grabbing device grabs the disc grab, if the disc is not placed at a correct position, the disc grabbing device will be unable to smoothly pick up the disc. Particularly, the disc grabbing device may touch the disc, continuously apply a force to the disc and cause damage to the disc. Therefore, how to provide a disc grabbing device capable of resolving the above problems has become a prominent task for the industries.

SUMMARY OF THE INVENTION

The invention is directed to a disc grabbing device adapted to a disc archive system to detect whether a disc is placed at a correct position lest the disc might be damaged.

According to one embodiment of the present invention, a disc grabbing device adapted to a disc archive system for grabbing at least one disc is provided. The disc grabbing device includes a center cylinder, a drive controller and a detection device. When the disc is grabbed by the disc grabbing device, the center cylinder passes through the center hole of the disc. The drive controller is configured to control the disc grabbing device to grab the disc. The detection device is electrically connected to the drive controller to detect a surface of a disc placed on a disc tray to be grabbed, and to correspondingly transmit a drive stop signal to the drive controller to stop the operation of the disc grabbing device.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements.

According to the disc grabbing device adapted to a disc archive system provided in the invention, the disc grabbing device can move upward and downward in the disc archive system to grab at least one disc placed on a disc tray. The disc grabbing device has a center cylinder. When the disc grabbing device moves downward to grab a disc, the center cylinder passes through the center hole of the disc to grab the disc.

When the disc grabbing device moves downward to grab the disc, the center cylinder may directly press the surface of the disc and damage the disc if the center of the center cylinder does not fall within the center hole range of the disc. To avoid the center cylinder directly pressing the surface of the disc and causing damage to the disc, the disc grabbing device of the invention has a detection device configured on the center cylinder to detect a surface of a disc. By detecting the surface of the disc, the disc grabbing device determines whether the position of the center cylinder corresponds to the center hole of the disc to confirm whether the disc is placed at a correct position. When the detection device detects the surface of the disc, which implies that the center of the center cylinder does not fall within the center hole of the disc range, the detection device will emit a drive stop signal to stop the operation of the disc grabbing device to avoid the center cylinder directly pressing the surface of the disc and causing damage to the disc. Detailed descriptions of the invention are disclosed below in a number of embodiments below with accompanying drawings.

First Embodiment

Figure 1:
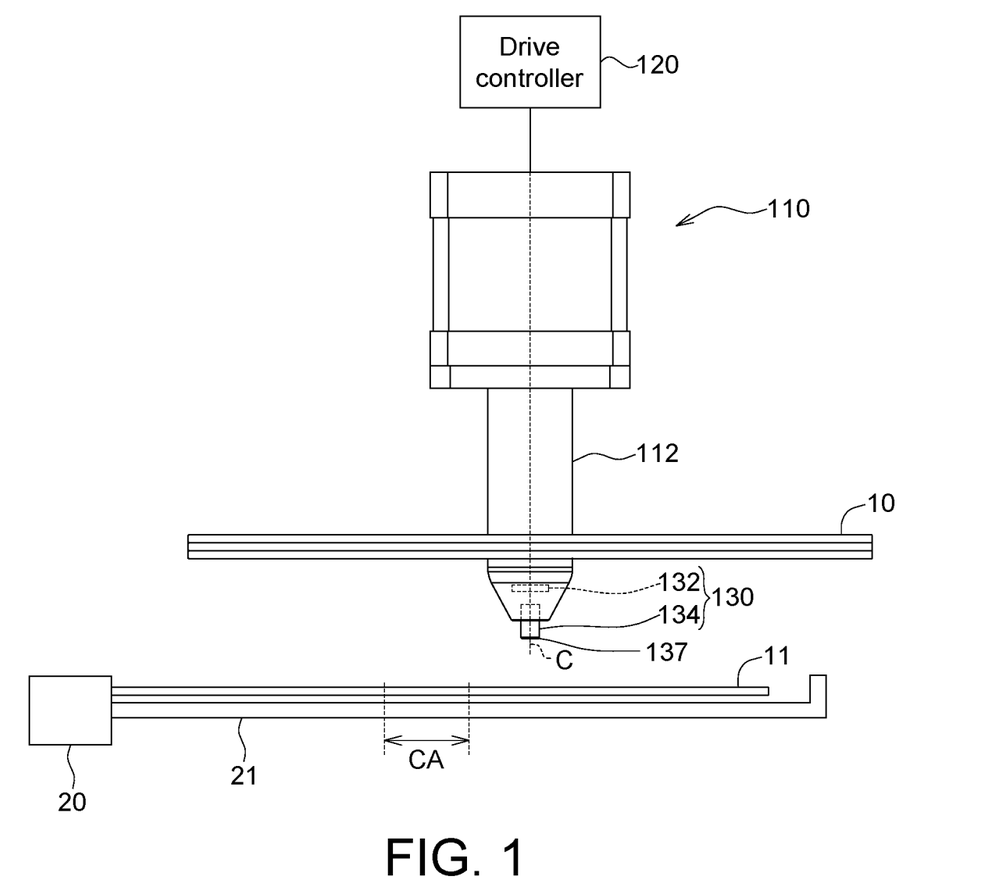
FIG. 1 is a schematic diagram of a disc grabbing device adapted to a disc archive system according to an embodiment of the invention.
Figure 2:
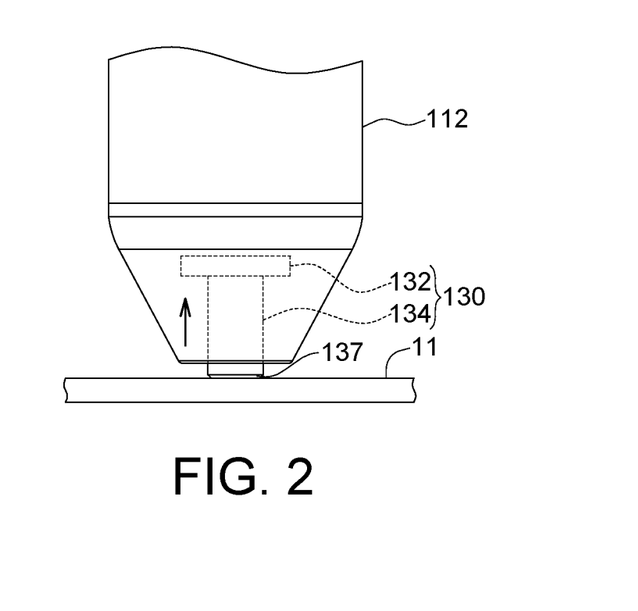
FIG. 2 is a schematic actuation diagram of a detection device of the disc grabbing device of FIG. 1 touching a surface of a disc.
Figure 3:
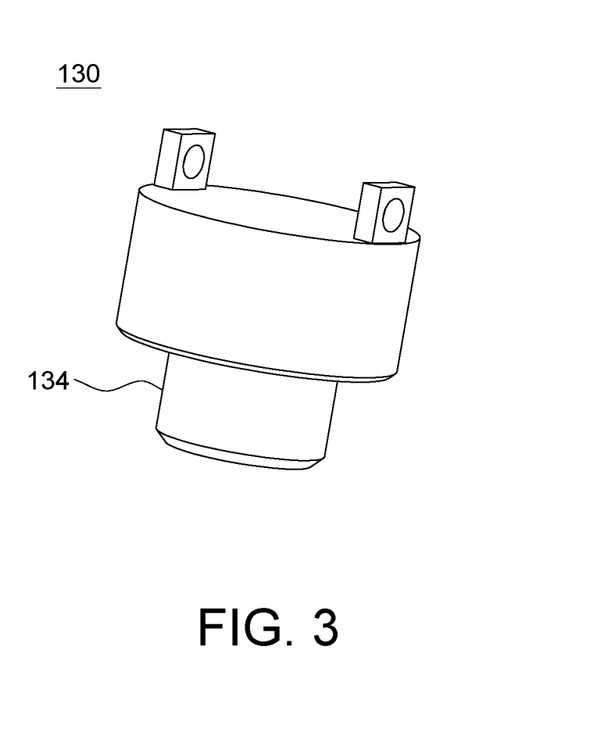
FIG. 3 is a schematic diagram of a detection device of the disc grabbing device.

FIG. 1 is a schematic diagram of a disc grabbing device 110 adapted to a disc archive system according to an embodiment of the invention. FIG. 2 is a schematic actuation diagram of a detection device 130 of the disc grabbing device of FIG. 1 touching a surface of the disc. FIG. 3 is a schematic diagram of a detection device 130 of the disc grabbing device 110.

Refer to FIG. 1, FIG. 2 and FIG. 3. The disc grabbing device 110 of the present embodiment includes a center cylinder 112, a drive controller 120 and a detection device 130. The disc grabbing device 110 further includes a disc grabbing mechanism (not illustrated) configured to grab or unload at least one disc 10. The drive controller 120 is configured to control the disc grabbing device 110 to pick and place the disc. The invention does not limit the design of the disc grabbing mechanism. The disc grabbing device 110 can have a disc grabbing mechanism (not illustrated) which grabs or unloads the disc 10 by grabbing the outer edge of the disc 10 or the peripheral portion of the center hole of the disc 10.

In an embodiment of the invention, the center cylinder 112 passes through the center hole of the disc 10 as indicated in FIG. 1 when the disc 10 is grabbed by the disc grabbing device 110.

As indicated in FIG. 1, the detection device 130 is electrically connected to the drive controller 120, and has a detection end 137 located at a terminal portion of the center cylinder 112 and located on a center axis C of the center cylinder 112. When the center cylinder 112 of the disc grabbing device 110 moves to the top of the disc tray 21 of the disc drive 20 to pick up the disc 11 placed on the disc tray 21, if the center axis C of the center cylinder 112 does not fall within the center hole range CA of the disc 11, the detection end 137 of the detection device 130 disposed at a terminal portion of the center cylinder 112 will touch a surface of the disc 11 when the center cylinder 112 of the disc grabbing device 110 moves downward. As indicated in FIG. 2, when the detection device 130 detects the surface of the disc 11, the detection device 130 will transmit a drive stop signal to the drive controller 120 to stop the operation of the disc grabbing device 110.

As indicated in FIG. 3, in the present embodiment, the detection device 130 can be realized by a key switch element or a pressure sensing element. The key switch element, when pressed, correspondingly generates a press signal. The press signal can be used as a drive stop signal, which is transmitted to the drive controller 120. The pressure sensing element, correspondingly generates a forces sensing signal. The forces sensing signal can be used as a drive stop signal, which is transmitted to the drive controller 120.

In an embodiment, the detection device 130 includes a sensing portion 132 and a pressing portion 134. The pressing portion 134 has a detection end 137 protruded from a terminal portion of the center cylinder 112. The pressing portion 134, when receiving a force, can be received in the center cylinder 112 to touch the sensing portion 132 to generate the drive stop signal. Therefore, the detection device 130 of the present embodiment can avoid the center cylinder 112 of the disc grabbing device 110 touching the surface of the disc 11, continuously applying a force to the disc and causing damage to the disc 11.

Second Embodiment

Figure 4:
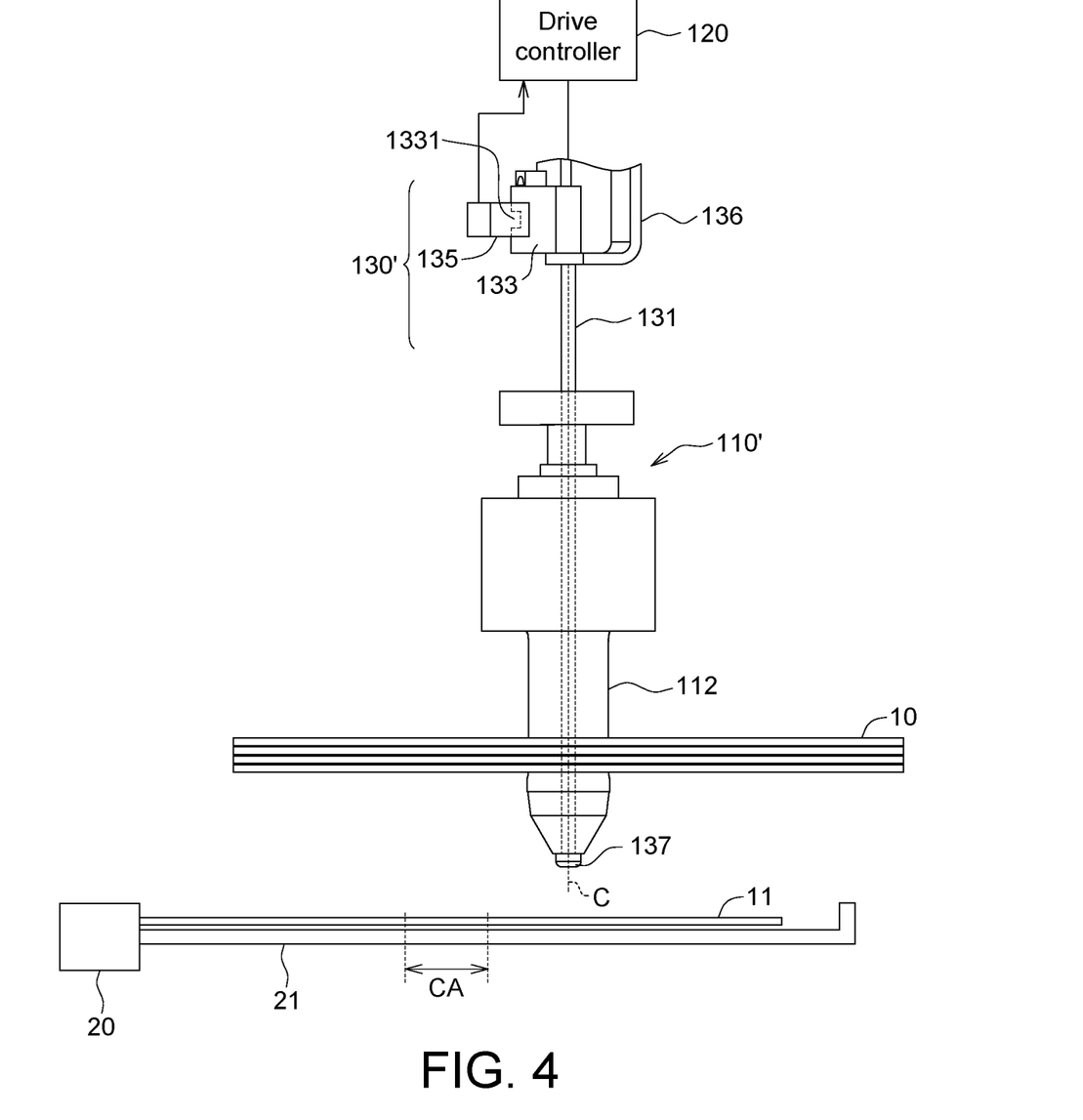
FIG. 4 is a schematic diagram of a disc grabbing device adapted to a disc archive system according to another embodiment of the invention.
Figure 5:
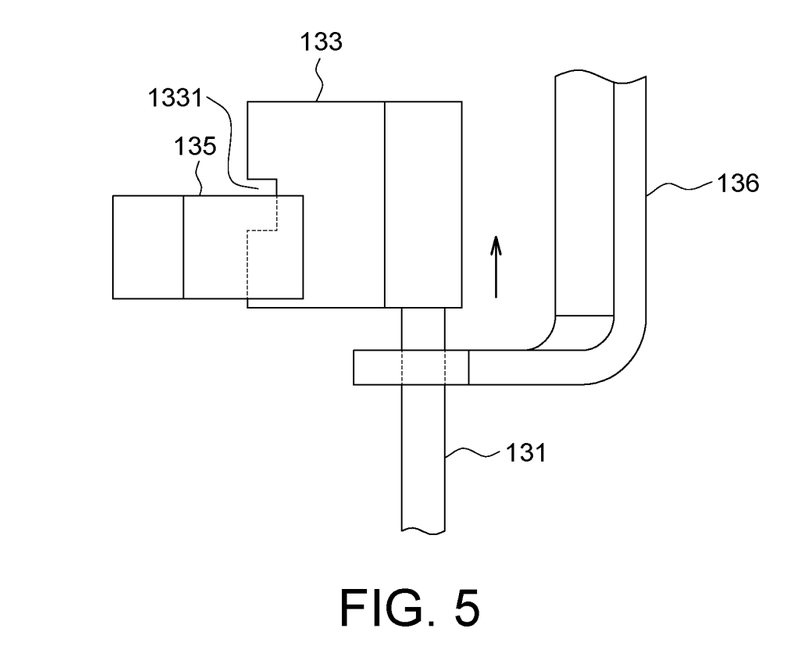
FIG. 5 is a schematic actuation diagram of a detection device of the disc grabbing device of FIG. 4 touching a disc.
Figure 6:
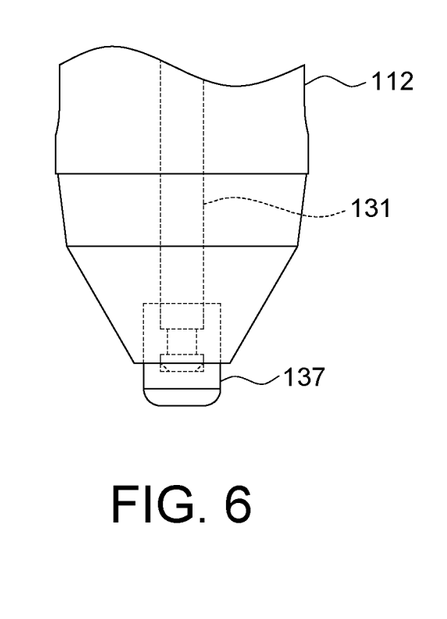
FIG. 6 is a schematic diagram of a terminal portion of a connecting rod of a detection device.

FIG. 4 is a schematic diagram of a disc grabbing device 110' adapted to a disc archive system according to another embodiment of the invention. FIG. 5 is a schematic actuation diagram of a detection device 130' of the disc grabbing device 110' of FIG. 4 touching a disc. FIG. 6 is a schematic diagram of a terminal portion of a connecting rod 131 of a detection device 130'.

Refer to FIG. 4, FIG. 5 and FIG. 6. The disc grabbing device 110' of the present embodiment includes a center cylinder 112, a drive controller 120 and a detection device 130'. Similarly, the disc grabbing device 110' further includes a disc grabbing mechanism (not illustrated) configured to grab or unload at least one disc 10, and the center cylinder 112 passes through the center hole of the disc 10 when the disc 10 is grabbed by the disc grabbing device 110'.

Similarly, as indicated in FIG. 4, the detection device 130' is electrically connected to the drive controller 120. The detection device 130' has a detection end 137 located at a terminal portion of the center cylinder 112 and located on a center axis C of the center cylinder 112. When the detection end 137 of the detection device 130' touches a surface of the disc 11, that is, when the detection device 130 detects a surface of the disc 11, the detection device 130' transmits a drive stop signal to the drive controller 120 to stop the operation of the disc grabbing device 110'.

In the present embodiment, the detection device 130' can be a connecting rod type detection device, which includes a connecting rod 131, a light blocking element 133, a light sensor 135 and a bearing base 136. The connecting rod 131 is slidably disposed in the center cylinder 112 and located on the center axis C of the center cylinder 112. The light blocking element 133 is disposed on the connecting rod 131, and separately leans on the bearing base 136. The light sensor 135 is configured to emit and receive an optical signal.

As indicated in FIG. 4, under the normal state, the light blocking element 133 leans on the bearing base 136; the connecting rod 131 passes through the bearing base 136 and extends downward into the center cylinder 112; and the terminal portion of the connecting rod 131 is a detection end 137 protruded from a terminal portion of the center cylinder 112. Besides, the light blocking element 133 has a notch 1331. Under the normal state, the optical signal of the light sensor 135 can pass through the notch 1331 without being shielded, that is, the light sensor 135 can normally receive the optical signal.

When the center cylinder 112 of the disc grabbing device 110' moves downward and the detection end 137 of the detection device 130' touches a surface of the disc 11, the connecting rod 131 will be moved upward. As indicated in FIG. 5, when the connecting rod 131 is pressed and moved upward and drives the light blocking element 133 to move upward, the position of the notch 1331 of the light blocking element 133 will move relatively and cause the light blocking element 133 to shield the optical signal. Therefore, the light sensor 135 cannot normally receive the optical signal. Meanwhile, the detection device 130' transmits the drive stop signal to the drive controller 120 to stop the operation of the disc grabbing device 110'.

In another embodiment, the light blocking element 133 can also be designed to shield the optical signal under the normal state. When the connecting rod 131 is pressed and moved upward and drives the light blocking element 133 to move upward, the light blocking element 133 will not shield the optical signal, such that the light sensor 135 can receive the optical signal and generate the drive stop signal. That is, when the shielding state of the optical signal changes, the detection device 130' will generate the drive stop signal.

As indicated in FIG. 6, the terminal portion of the connecting rod 131 can be the detection end 137 covered with a soft material (such as rubber) to avoid the disc being scratched.

Third Embodiment

Figure 7:
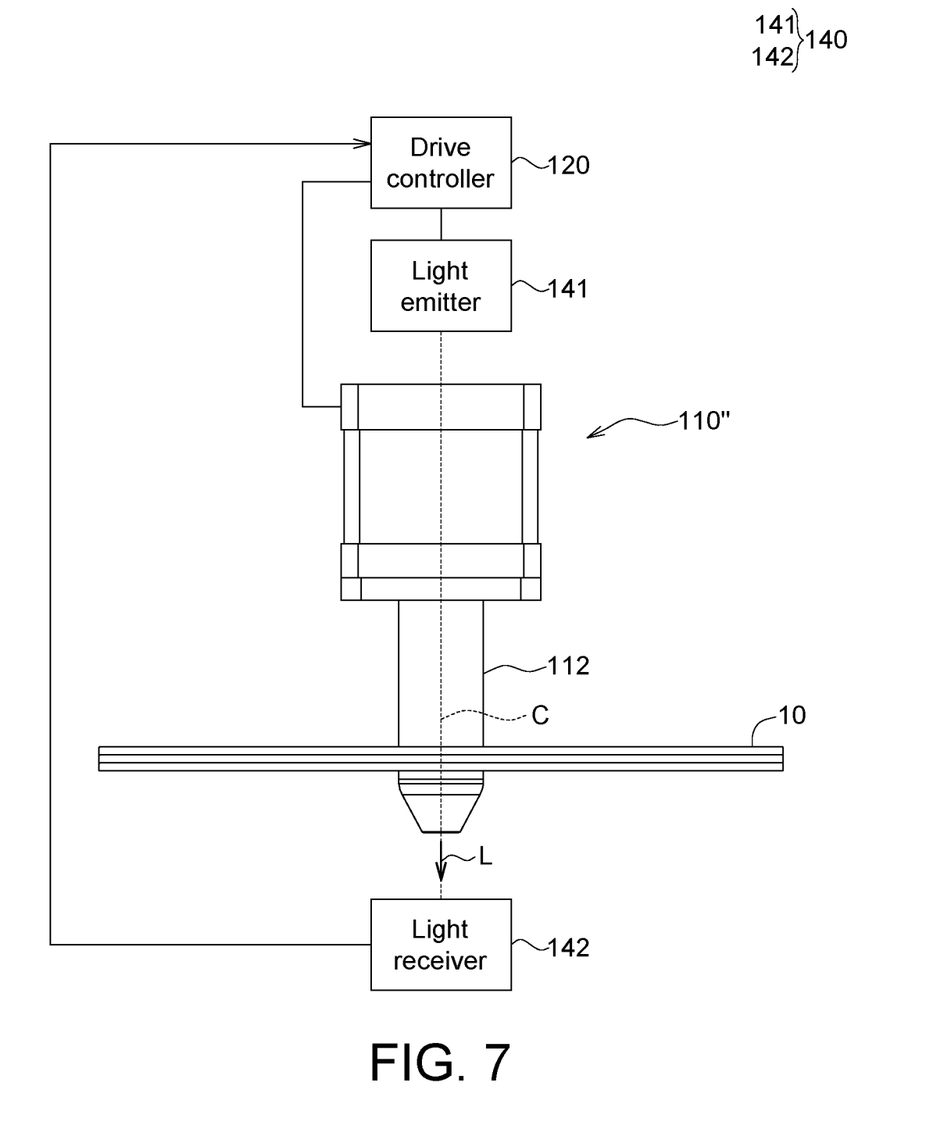
FIG. 7 is a schematic diagram of a disc grabbing device adapted to a disc archive system according to another embodiment of the invention.
Figure 8:
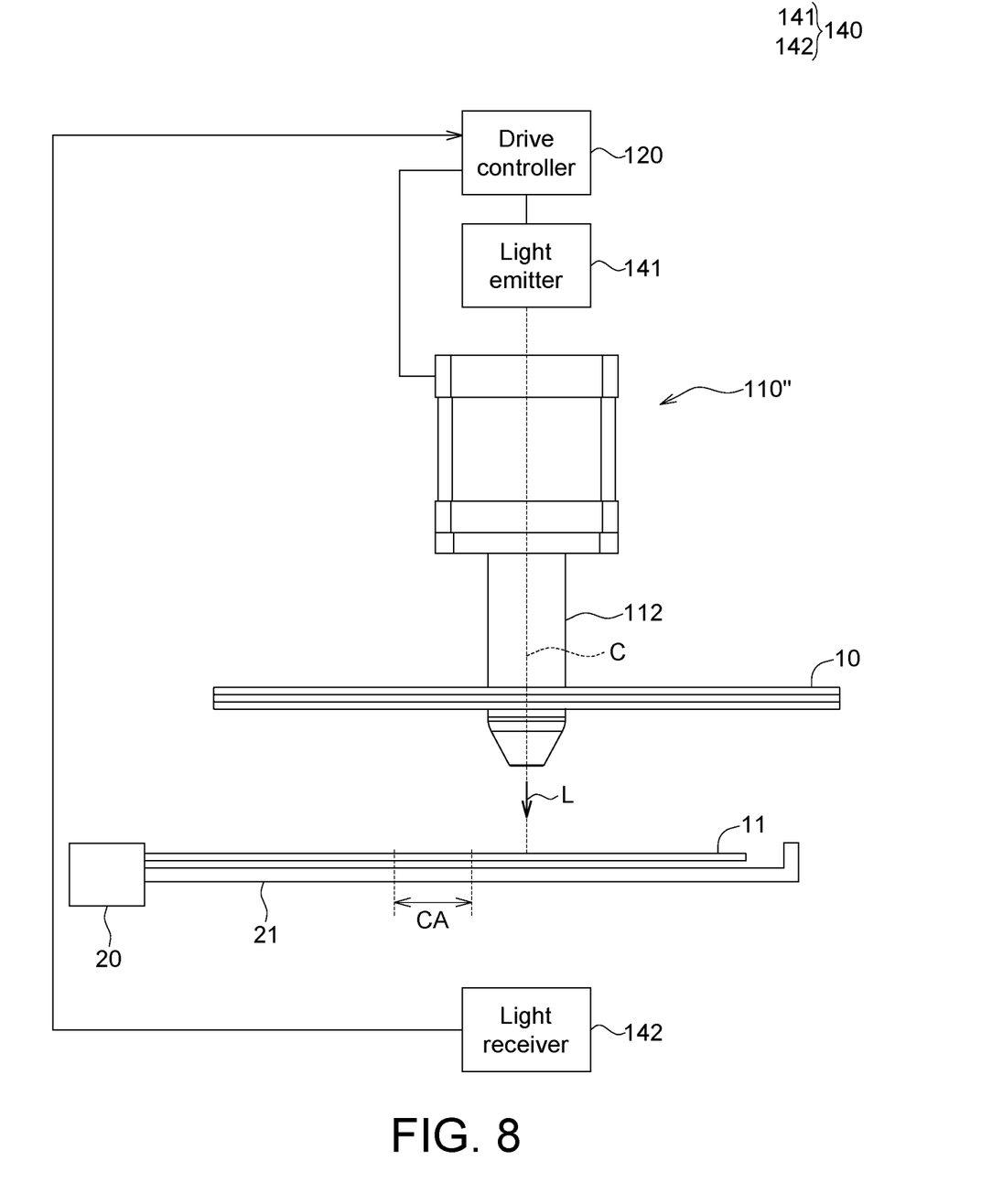
FIG. 8 is a schematic diagram of a detection device of the disc grabbing device of FIG. 7 detecting a surface of a disc.

FIG. 7 is a schematic diagram of a disc grabbing device 110" adapted to a disc archive system according to another embodiment of the invention. FIG. 8 is a schematic diagram of a detection device 140 of the disc grabbing device 110" of FIG. 7 detecting a surface of the disc.

Refer to FIG. 7 and FIG. 8. The disc grabbing device 110" includes a center cylinder 112, a drive controller 120 and a detection device 140. Similarly, the disc grabbing device 110" further includes a disc grabbing mechanism (not illustrated) configured to grab or unload at least one disc 10, and the center cylinder 112 passes through the center hole of the disc 10 when the disc 10 is grabbed by the disc grabbing device 110". In the first embodiment and the second embodiment, the detection devices 130 and 130' both determine whether the positon of the center cylinder of the disc grabbing device corresponds to the center hole of the disc by detecting the surface of the disc in a contact manner to confirm whether the disc is placed at a correct position. To reduce the possibility of the surface of the disc being damaged, the detection device 140 of the present embodiment detects the surface of the disc in a non-contact manner.

As indicated in FIG. 7 and FIG. 8, the detection device 140 can be a non-contact type detection device. The detection device 140 includes a light emitter 141 and a light receiver 142. The center cylinder 112 is a hollow cylinder. The light emitter 141 is configured to emit a light L passing through the center cylinder 112. The light receiver 142 is located under the disc tray 21, and receives the light L passing through the center cylinder 112. The light source of the light emitter 141 is such as a laser diode, but the invention is not limited thereto. The light receiver 142 is such as a photo diode, but the invention is not limited thereto. The light receiver 142 is configured to convert an optical signal into an electric signal such as a short pulse signal.

When the center cylinder 112 of the disc grabbing device 110" moves to the top of the disc tray 21 of the disc drive 20 to pick up the disc 11 placed on the disc tray 21, under the normal state, the center axis C of the center cylinder 112 will fall within the center hole range CA of the disc 11. Therefore, the light L emitted from the light emitter 141 will pass through the center cylinder 112 and the center hole of the disc 11, such that the light receiver 142 can receive the light L.

Conversely, as indicated in FIG. 8, if the center axis C of the center cylinder 112 does not fall within the center hole range CA of the disc 11, the light L emitted from the light emitter 141 will pass through the center cylinder 112 and will hit the surface of the disc 11. That is, the light L will be shielded by the disc 11 and the light receiver 142 will be unable to receive the light L. Meanwhile, the detection device 140 determines that the disc is not placed at the correct position. When the detection device 140 detects that the disc is not placed at the correct position, the detection device 140 will transmit a drive stop signal to the drive controller 120 to stop the operation of the disc grabbing device 110".

As disclosed in the two embodiments of the invention, the contact type detection device of the disc grabbing device, when pressed, transmits a drive stop signal, which enables the drive controller to timely stop the operation of the disc grabbing device and avoid the disc grabbing device continuously pressing and causing damage to the disc. Besides, according to another embodiment of the invention, when the optical signal emitted from the non-contact type detection device of the disc grabbing device is shielded, the non-contact type detection device will transmit a drive stop signal, which enables the drive controller to timely stop the operation the disc grabbing device and avoid the disc grabbing device continuously pressing and causing damage to the disc.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A disc grabbing device adapted to a disc archive system for grabbing at least one disc, wherein the disc grabbing device comprises:
    a center cylinder, which passes through the center hole of a disc wherein the disc is grabbed by the disc grabbing device;
    a drive controller configured to control the disc grabbing device to pick and place the disc; and
    a detection device electrically connected to the drive controller to detect a surface of a disc placed on a disc tray to be grabbed, and to correspondingly transmit a drive stop signal to the drive controller to stop an operation of the disc grabbing device,
    wherein the detection device has a detection end protruded from a terminal portion of the center cylinder and located on a center axis of the center cylinder.

2. The disc grabbing device according to claim 1, wherein when the detection end of the detection device is pressed by the surface of the disc to be grabbed, the detection device emits the drive stop signal.

3. The disc grabbing device according to claim 1, wherein the detection device is a key switch element or a pressure sensing element.

4. The disc grabbing device according to claim 1, when the center axis of the center cylinder moves downward and does not fall within a center hole range of the disc, the detection end of the detection device touches the surface of the disc placed on the disc tray to be grabbed.

5. The disc grabbing device according to claim 1, wherein the detection end is covered with a soft material.

6. A disc grabbing device adapted to a disc archive system for grabbing at least one disc, wherein the disc grabbing device comprises:
    a center cylinder, which passes through the center hole of a disc wherein the disc is grabbed by the disc grabbing device;
    a drive controller configured to control the disc grabbing device to pick and place the disc; and
    a detection device electrically connected to the drive controller to detect a surface of a disc placed on a disc tray to be grabbed, and to correspondingly transmit a drive stop signal to the drive controller to stop an operation of the disc grabbing device, wherein the detection device comprises:

a connecting rod slidably disposed in the center cylinder, wherein the connecting rod has a detection end protruded from a terminal portion of the center cylinder;

a light blocking element disposed on the connecting rod; and a light sensor configured to emit and receive an optical signal, wherein when the detection end is pressed by the surface of the disc to be grabbed and causes the connecting rod to move, the connecting rod drives the light blocking element to shield or not to shield the optical signal, wherein when a shielding state of the optical signal changes, the detection device emits the drive stop signal.

7. The disc grabbing device according to claim 6, when the center axis of the center cylinder moves downward and does not fall within a center hole range of the disc, the detection end of the detection device touches the surface of the disc placed on the disc tray to be grabbed.

8. The disc grabbing device according to claim 6, wherein the light blocking element has a notch, and under a normal state, the optical signal of the light sensor passes through the notch without being shielded.

9. The disc grabbing device according to claim 8, wherein when the center axis of the center cylinder moves downward and does not fall within a center hole range of the disc, the detection end of the detection device touches the surface of the disc placed on the disc tray to be grabbed, then the connecting rod moves upward to drive the light blocking element to move upward and cause the light blocking element to shield the optical signal.

10. The disc grabbing device according to claim 6, wherein the light blocking element has a notch, and under a normal state, the optical signal of the light sensor is shielded by the light blocking element.

11. The disc grabbing device according to claim 10, wherein when the center axis of the center cylinder moves downward and does not fall within a center hole range of the disc, the detection end of the detection device touches the surface of the disc placed on the disc tray to be grabbed, then the connecting rod moves upward to drive the light blocking element to move upward and cause the optical signal passing though the notch without being shielded.

12. The disc grabbing device according to claim 6, wherein the detection end is covered with a soft material.

* * * * *